United States Patent [19]

Wang et al.

[11] Patent Number: 5,051,182

[45] Date of Patent: Sep. 24, 1991

[54] HYDROPHOBIC MICROPORUS MEMBRANE

[76] Inventors: Ying Wang, 59 Cooperwood Square, Scarborough, Ontario, Canada, M1V 2C2; Hung N. Choi, 22/7, B3, No. 14-22 Kawo St., Aberdeen, Hong Kong

[21] Appl. No.: 418,273

[22] Filed: Oct. 6, 1989

[51] Int. Cl.$^5$ ............................................. E01D 71/26
[52] U.S. Cl. .................................. 210/500.27; 264/41
[58] Field of Search ................. 264/41, 298, 212, 556, 264/DIG. 48, DIG. 62; 210/500.21, 500.22, 500.27, 500.36, 500.42

[56] References Cited

U.S. PATENT DOCUMENTS 4,539,256 9/1985 Shipman et al. ...................... 264/41

Primary Examiner—Frank Sever
Attorney, Agent, or Firm—Rogers, Bereskin & Parr

[57] ABSTRACT

A membrane that is prepared in a water in oil system and comprises a hydrophobic polymer film having controlled porosity. Such membranes are particularly well suited for use in oil drilling processes; in the separation of oil from the waste water of oil refineries; in the separating of oil from the waste water resulting from cleaning oil tankers; and the separation of oil from water used in cleaning oil tanks or containers for industrial equipment. The membranes can also be used in the dewatering process of edible protein as well as the dewatering of liquid fragrances.

11 Claims, 2 Drawing Sheets

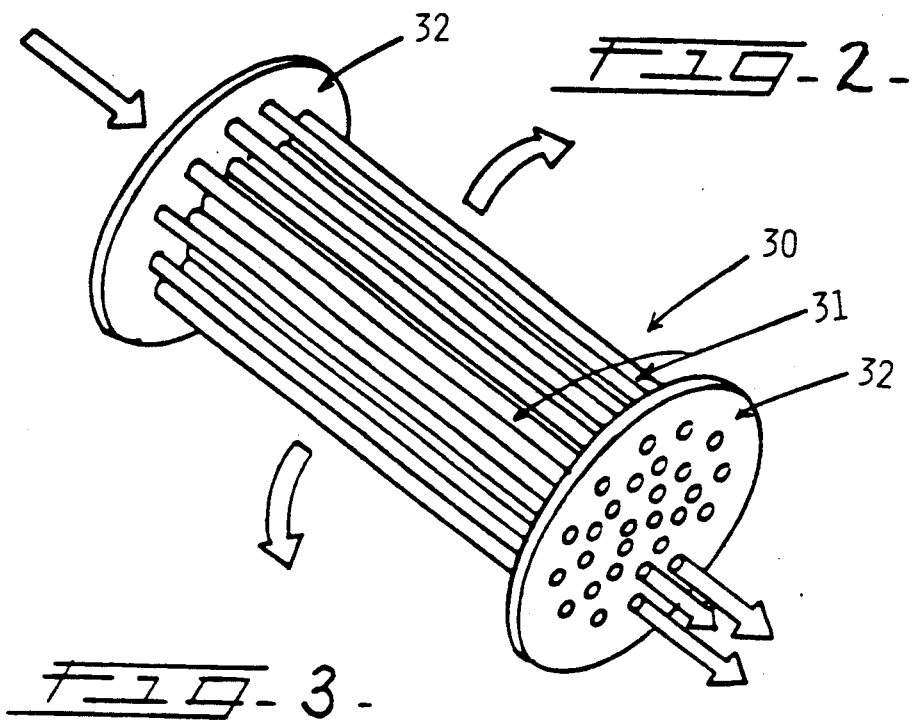
FIG-2-
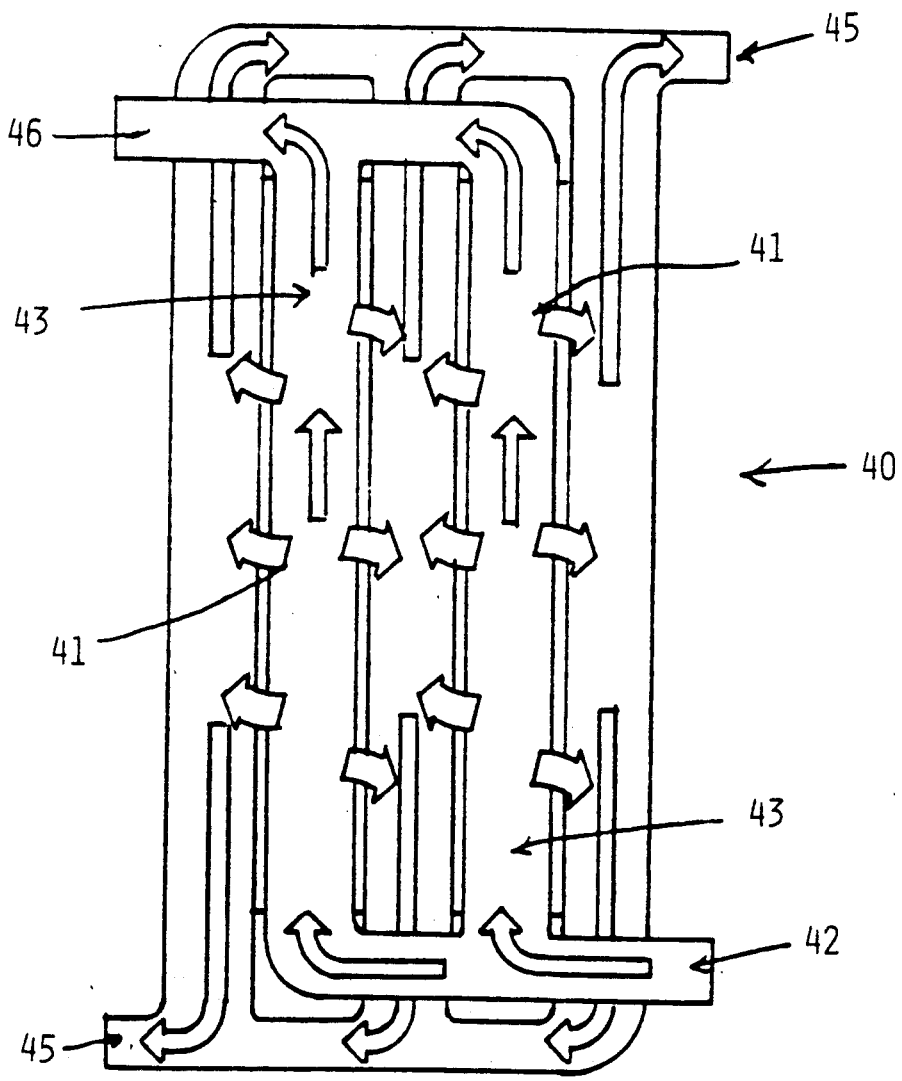
FIG-3-

5,051,182

HYDROPHOBIC MICROPORUS MEMBRANE

FIELD OF THE INVENTION

The present invention relates to hydrophobic porous membranes that are prepared by water in oil polymerization systems.

BACKGROUND OF THE INVENTION

Porous membranes have been utilized for a variety of purposes such as ultrafiltration and reverse osmosis. They function as a screen or sieve and retain on their surface particles larger than their pore diameter.

There are many potential applications for porous membranes. For example, the smoking of tobacco has been widespread for many years and has resulted in substantial concerns regarding the health hazards caused by toxic components of tobacco smoke. Conventional fibrous filters have not been very satisfactory in reducing the amount of tar, carbon monoxide and other components of smoke.

Porous membranes have also been used to treat waste water, purify sewage, separate solvents from solutions containing particulates, and in the desalination of sea water, separate gas components in a gas mixture, and in like applications.

A variety of techniques have been utilized to prepare porous membrane filters. U.S. Pat. No. 3,100,721 describes a process for making a microporous film from nylons, polyesters and vinyl polymers by coating a polymer dispersion onto a cellophane sheet, treating the coating with water, drying the coating and stripping it from the cellophane sheet.

U.S. Pat. Nos. 3,642,668, 4,203,847 and 4,203,848 describe the production of a porous polyvinylidene fluoride film by coating a polymer solution on a substrate that is immersed in a leaching bath.

SUMMARY OF THE INVENTION

The present invention relates to a hydrophobic polymeric membrane having controlled pore size that is prepared in a water-in-oil system where an oil phase is the continuous phase and the water phase contains the polymer. The water phase is also referred to herein as the discontinuous phase or polymer phase.

A pore forming agent is incorporated into the system. If the pore forming agent is water-soluble it is incorporated into the discontinuous (water) phase. If the pore forming agent is a normally oil soluble material, it is dissolved in the continuous phase.

The system is heated to evaporate the continuous phase and concentrate the discontinuous polymer containing phase so that crosslinking takes place. By varying the ionic strength of the pore forming agent one can effect the surface tension between the droplets or discontinuous phase and the continuous phase. This results in controlled porosity.

The hydrophobic membranes of the present invention can be used in various oil-water separation processes where the major constituent of the liquid being treated is oil. For example, they may be used to separate oil from water in crude oil drilling, to dewater animal or vegetable oils, or in similar applications.

BRIEF DESCRIPTION OF THE DRAWINGS

In the drawings,

FIG. 2 is a perspective view of a multichannel tubular module incorporating membranes of the present invention; and FIG. 3 is a sectional view of a flat sheet plate and frame module incorporating membranes of the present invention.

DETAILED DESCRIPTION OF THE INVENTION

Figure 1:
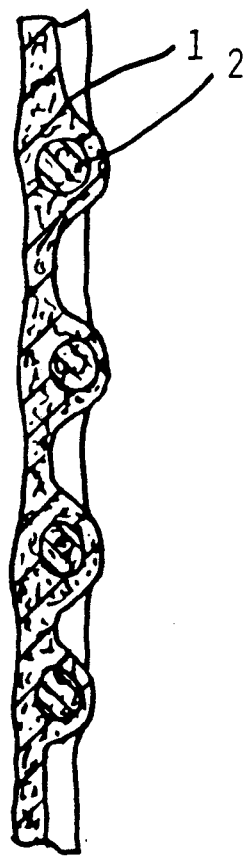
FIG. 1 is a cross sectional view of a membrane of the present invention coated on a support.

The membranes of the present invention comprise a crosslinked, water-insoluble polymer having micropores of a controlled porosity.

Suitable polymers include those that are hydrophobic and have an affinity for nonpolar compounds. Such polymers include polyolefins, polysilanes and fluorinated polyolefins. Representative polymers useful in the present invention include those based upon monomers such as vinyltrioxyethylsilane, vinyl trimethoxyoxyethylsilane, vinyltrichlorosilane, ethyltrioxyethylsilane and polymers such as polytetrafluoroethylene, polysulfone, polytrifluorochloroethylene, polytrifluoroethylene as well as compatible mixtures thereof. The polymer is generally present in the water-in-oil system in a concentration ranging from 2 to 15 percent by weight. The number average molecular weight of these polymers can range from about 50,000 to about 500,000.

Suitable pore forming agents can include water-soluble inorganic salts such as sodium chloride, calcium chloride and sodium sulfate that are dissolved in the discontinuous phase. Alternatively, liquid pore forming agents such as polyethylene glycol or sodium dodecylsulfonate form part of the continuous phase. The pore forming agents are generally present in the water-in-oil system in an amount in the range of from about 0.05 to about 30 percent by weight of the total system. When inorganic salts are utilized as the pore forming agent, the ionic strength of the salt-containing solution should be in the range of from about 0.01N to about 1.0N. When polymeric pore forming agents are utilized, their number average molecular weight can range from about 200 to about 100,000.

By controlling the ionic strength one can control the relative surface tensions of the discontinuous phase and the continuous phase. Thus, as the continuous phase is driven off, the pore forming agent causes the polymer chain to curl and entrap some oil. The pore size can be controlled by varying the ionic strength and the amount of pore forming agent. The diameter of the pores is generally in the range of from about 0.01 to 100 microns.

Similarly, as the continuous phase is driven off, the concentration of the crosslinking or bonding agent increases and crosslinking of the polymer or bonding of the polymer film to a suitable support takes place. Conventional crosslinking agents or bonding agents such as sodium tetraborate, aluminum hydroxide, acetic acid, boric acid, oxalic acid, potassium dichromate and potassium chromate may be utilized.

The resultant pores may form a direct or tortuous path through the film depending on the thickness of the film, the size of the pores and other factors.

The system can also contain surfactants if smaller micelles are desired. Suitable surfactants include conventional nonionic, cationic and anionic surfactants, which all perform equally well. Examples of suitable surfactants are dodecyl sodium sulfate and alkylsulfonates.

The membranes can be used with or without a support member. If it is desired to use a support member, any suitable porous substrate can be used. The thickness of the support member is generally in the range of 0.02-30 mm and the pores generally have a diameter in the range of 5-100 microns. Representative support members include commercially available high and low temperature support members that are fabricated from aluminum oxide, stainless steel graphite, polypropylene and polyvinyl chloride. It may also be desirable to pretreat the support member with an oxidizing agent to promote adhesion of the membrane film to the support member.

The size and porosity is measured by the mercury pressing technique.

The membranes can be formed by conventional techniques such as casting by coating techniques such as immersion, spraying or by dynamic forming techniques when a support member is utilized.

When the porous membranes of the present invention are prepared by casting techniques, a 5 to 25 weight percent concentration of the desired polymer in a water, organic solvent or mixed solvent system is prepared. From 1 to 8 percent by weight of a suitable pore forming agent is added and thoroughly mixed in the polymer solution. A layer having a thickness in the range of from about 0.1 to about 0.5 mm is applied to the surface of the support member or a substrate from which the membrane can be removed. A cross linking agent or coagulant is initially present or then added to cure the membrane. The pore forming agent is then washed away. The membrane is then dried and may be used.

If immersion techniques are utilized, the support member can be immersed in a 0.5-10 weight percent polymer solution for 3-300 seconds. The polymer coated support member is then immersed in a solution of a coagulant or cross linking agent for 3 to 10 minutes, rinsed and dried.

Sprays containing 0.5-5 weight percent polymer can also be used. The thickness of the membrane can be controlled by varying the spraying time and the polymer concentration.

When dynamic forming techniques are utilized, the porous support member is placed in a pressurized cylinder. Polymer in a concentration of about 3 to 200 ppm and a pore forming agent in a concentration of about 1 to 800 ppm are added to a feed tank wherein they form a suspension. The suspension is then pumped into the pressurized cylinder until the porous support member is treated to the desired degree and dried.

Emulsions made from silicone polymers can be used as materials in fabricating dynamically formed membranes. The emulsion consists of a soluble organic solvent such as alcohol, and another solvent such as acetone, and a cross-linker such as acetic acid or boric acid. Lauric acid-tin is a suitable catalyst, and water is used to dilute the mixture. When the membrane materials are insoluble organic silicone polymers, the solvent used is a petroleum ether having a boiling point of about 30° to 90° C.

After the dynamic membrane has been formed a process of post treatment must be carried out. This includes heating the membrane support body for at least 30 minutes at a temperature of between 40°-100° C. Representative systems include:

| Ingredient | Concentration |
| --- | --- |
| I - a) Emulsion of organic silicone polymers and organic polymers (e.g., polydimethyl siloxane and benzyltriethyloxide) | 0.1-5% |
| Emulsion agent | 95-99.9% |
| b) Cross linker | 0.1-4% |
| Primer | 0.02-2% |
| Solvent | 94-99.88% |
| II - a) Organic silicone polymers and organic polymer (e.g., polydimethyl siloxane and benzyltriethyloxide) | 0.1-5% |
| Solvent | 95-99.9% |
| b) Cross linker | 0.1-4% |
| Primer | 0.02-2% |
| Solvent | 94-99.88% |

The subcomponents of the system are designated by small letters; the concentrations total 100% for each subcomponent.

Fluorinated polymers such as polytetrafluoroethylene, polytrifluorochloroethylene and polytrifluoroethylene and polysulfones such as poly (4phenoxy 8-propyl 13-phenoxy) sulfane may also be used to produce dynamically formed membranes. Post treatment such as (a) direct heating and (b) submerging under fluorinated acid or oxynated agent followed by heating should be used. A representative fluorinated polymer system is as follows:

| Ingredient | Concentration |
| --- | --- |
| Fluorinated polymeric emulsion | 5-5000 ppm |
| Adhesive (e.g. epoxy resin) | 0.2-500 ppm |
| Indicator (e.g. phenol red or xylenol blue) | 0.1-50 ppm |

The Fluorinated polymeric emulsion contains ingredients in the same proportions as in Formulation I above, with a fluorinated polymer substituted for the organic silicone polymer in that example. The concentrations are the concentration, in parts per million, of the particular ingredient in the entire system. The adhesive is used to enhance the ability of the membrane material to stay in place within the pores of the supporting material. The pore size is regulated by observing the fading or absence of the indicator, which can be either phenol red or xylenol blue dye.

When the post treatment technique of submerging under fluorinated acid or oxynated agent followed by heating is used, the concentration of acid or agent is 1-80% and the heating temperature is between 100°-300° C.

EXAMPLE

A hydrophobic membrane is dynamically formed using the fluorinated polymeric emulsion disclosed above which is a mixture of polytefrafluroethylene and polyvinyl alcohol in a 4 to 1 ratio. The concentration of the emulsion is approximately 15 ppm. The mixture of emulsion, adhesive and indicator is then placed on a pourous ceramic module with a chute. When the color imparted by the indicator diminishes or disappears entirely the proper pore size is attained. The membrane is then dynamically formed under a pressure of 20 Kg/cm$^2$.

The membrane is then removed from the module and submerged under 5% H$_2$SO$_4$ for 30 minutes at a temperature of not to exceed 100° C. The color of the membrane changes from white to dark brown at this point. The membrane is then rinsed under water in order to wash away any traces of acid that remain on the surface before replacing it in the module.

A membrane made according to the above example was tested by pumping a mixture of coal oil and water in a ratio of 6:1 through the module with the membrane therein. The temperature was elevated to 80° C. at a pressure of 1 Kg/cm$^2$. The separation of the oil from the water was 99.68%.

FIG. 1 is a sectional view of a membrane 1 coated on the surface of a fibrous support member 2.

FIG. 2 illustrates the use of porous membranes of the present invention in a tubular multichannel module 30. The module 30 contains a plurality of hollow thin walled tubular membranes 31 and rings 32 at both ends of the module 30 to fix the tubular members 31 in an appropriate position in the module 30.

FIG. 3 illustrates the use of porous membranes of the present invention in a plate and frame device 40. Flat sheets of membrane 41 are mounted in the device 40. The liquid being treated enters through inlet 42 and flows through channels 43. The permeate passes through the membranes 41 and exists through outlets 44 and 45. Retentate exits through outlet 46.

While the invention has been described in detail and with reference to specific embodiments thereof, it will be apparent to one skilled in the art that various changes and modifications can be made therein without departing from the spirit and scope thereof.

We claim:

1. A membrane having controlled porosity that is prepared in a water-in-oil dispersion by a process that comprises the steps of:
   a) forming a water-in-oil system wherein the oil phase contains a hydrophobic polymer;
   b) adding to the system dispersion a pore forming agent and a crosslinking agent or a coagulant for the polymer to form a suspension;
   c) coating the thus formed suspension on a substrate;
   d) evaporating the water from the suspension coated on the substrate to concentrate and cross link the polymer present while enveloping the pore forming agent with the polymer; and
   e) removing the pore forming agent from the coagulated polymer.

2. A membrane as in claim 1 wherein the hydrophobic polymer is selected from the group consisting of polyolefins, polysilanes and fluorinated polyolefins.

3. A membrane as in claim 1 wherein the pore forming agent is an inorganic salt.

4. A membrane as in claim 1 wherein the pore forming agent is polyethylene glycol.

5. A membrane as in claim 1 wherein the membrane is supported by a substrate.

6. A filter for the separation of oil and water that comprises a hydrophobic polymer membrane having a porosity within a predetermined range made according to the process of claim 1.

7. A filter as in claim 6 wherein the membrane pores have a diameter in the range of from about 0.01 to about 100 microns.

8. A filter as in claim 6 wherein the membrane is coated on a support member.

9. A filter as in claim 8 wherein the support member has pores with a diameter in the range of from about 5 to about 100 microns.

10. A filter as in claim 9 wherein the polymer is selected from the group consisting of polyolefins, polysilanes, and fluorinated polyolefins.

11. A membrane as claimed in claim 1, wherein in step (c) the suspension is coated on the substrate by immersion, spraying or dynamic forming techniques.

* * * * *

UNITED STATES PATENT AND TRADEMARK OFFICE
CERTIFICATE OF CORRECTION

PATENT NO. : 5,051,182

DATED : September 24, 1991

INVENTOR(S) : Ying Wang

It is certified that error appears in the above-identified patent and that said Letters Patent is hereby corrected as shown below:

On the title page, under item [19], "Wang et al." should be --Wang--; and in item [76] Inventors:, remove "Hung N. Choi, 22/7, B3, No. 14-22 Kawo St. Aberdeen, Hong Kong".

Signed and Sealed this

Twenty-third Day of February, 1993

Attest:

STEPHEN G. KUNIN

*Attesting Officer*  Acting Commissioner of Patents and Trademarks